United States Patent
Bhagavatula et al.

(10) Patent No.: US 9,291,775 B2
(45) Date of Patent: Mar. 22, 2016

(54) OPTICAL FIBER CONNECTOR WITH ACHROMATIC GRIN LENS

(71) Applicant: Corning Optical Communications LLC, Hickory, NC (US)

(72) Inventors: Venkata Adiseshaiah Bhagavatula, Big Flats, NY (US); Robert Adam Modavis, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 164 days.

(21) Appl. No.: 14/182,605

(22) Filed: Feb. 18, 2014

(65) Prior Publication Data
US 2015/0277055 A1 Oct. 1, 2015

(51) Int. Cl.
  *G02B 6/32* (2006.01)
  *G02B 3/00* (2006.01)
  *G02B 6/38* (2006.01)

(52) U.S. Cl.
  CPC .............. *G02B 6/32* (2013.01); *G02B 3/0087* (2013.01); *G02B 6/3846* (2013.01)

(58) Field of Classification Search
  CPC ....... G02B 6/32; G02B 6/3807; G02B 3/0087
  USPC ............................................................ 385/34
  See application file for complete search history.

(56) References Cited

U.S. PATENT DOCUMENTS

| | | | |
|---|---|---|---|
| 5,892,868 A | 4/1999 | Peck, Jr. et al. | |
| 2004/0156585 A1* | 8/2004 | Matusick | G02B 6/2552 385/33 |
| 2007/0147733 A1* | 6/2007 | Matsumura | G02B 6/32 385/34 |
| 2008/0180787 A1* | 7/2008 | DiGiovanni | G02B 6/02019 359/334 |
| 2009/0153959 A1* | 6/2009 | Tao | B29D 11/00278 359/463 |
| 2009/0190883 A1* | 7/2009 | Kato | A61B 5/0066 385/33 |
| 2012/0321249 A1* | 12/2012 | DeMeritt | G02B 3/0087 385/34 |
| 2013/0003186 A1 | 1/2013 | Beadie et al. | |

OTHER PUBLICATIONS

Fleming, J.W., "Dispersion in GeO2-SiO2 glasses", Applied Optics, vol. 23, No. 24, pp. 4486-4493, Dec. 15, 1984.
Gilsdorf, R. et al, "Single-mode fiber coupling efficiency with graded index rod lenses", Applied Optics, vol. 33, No. 16, pp. 3440-3445, Jun. 1, 1994.
Marcuse, D., "Loss analysis of single-mode fiber splices", BSTJ, vol. 56, No. 5, pp. 703-718, 1977.
Palais, J., "Fiber coupling using graded index rod lenses", Applied Optics, vol. 19, No. 12, pp. 2011-2018, Jun. 15, 1980.

* cited by examiner

*Primary Examiner* — Jerry Blevins (57) ABSTRACT

An optical fiber connector for coupling light to or from an input fiber is disclosed. The connector includes a first alignment member that holds an achromatic GRIN lens. The achromatic GRIN lens has a half-pitch axial length L, wherein $0.5\ mm \leq L \leq 5\ mm$. The optical fiber connector has a field fiber that interfaces with the achromatic GRIN lens. The connector is operable between operating wavelengths of 800 nm and 1600 nm with a coupling loss of less than 0.2 dB.

17 Claims, 12 Drawing Sheets

PRIOR ART

OPTICAL FIBER CONNECTOR WITH ACHROMATIC GRIN LENS

FIELD

The present disclosure relates to optical fibers and optical fiber connectors, and in particular relates to an optical fiber connector with an achromatic GRIN lens that can connect with single-mode or multimode optical fibers over a wide range of operating wavelengths.

BACKGROUND

Optical fiber connectors are used in a variety of telecommunications applications to connect one optical fiber to another, or to connect an optical fiber to a telecommunications device. Certain optical fiber connectors include a short (e.g., 15 mm to 20 mm) section of optical fiber called a stub fiber that interfaces with a field optical fiber within the connector. The stub optical fiber is secured in a ferrule of the connector and polished at a factory such that preparing an end face of the connector in the field is not required. When such an optical fiber connector is operably connected (mated) to another optical fiber connector, the stub fiber resides between the field fiber of its own connector and the stub fiber of the mating connector (or, in the event the mating connector does not include a stub fiber, whatever optical fiber is presented for optical coupling by the mating connector). These types of optical fiber connectors are commonly referred to as no epoxy, no polish connectors or mechanical splice connectors, and one example is the UniCam® fiber optic connector made by Corning Optical Communications LLC.

Typically, different stub fibers are required in a no epoxy, no polish optical fiber connector depending on whether the connector is to be single-mode or multimode. Further, different stub fibers are typically required depending on the operating wavelength. Thus, there is a need for a "universal stub" that would simplify the field installation of optical fiber connectors by eliminating the dependency on the fiber type and the operating wavelength.

SUMMARY

An aspect of the disclosure is an optical fiber connector for coupling light to or from an input fiber over a range of operating wavelengths between first and second operating wavelengths. The optical fiber connector includes: first alignment member; a gradient-index (GRIN) lens held by the alignment member, the GRIN lens having a front end, a back end, and an axial length L that is substantially equal to P/2, where P is a length over which the light with the range of operating wavelengths traverses one period of a sinusoidal path through the GRIN lens, and wherein 0.5 mm≤L≤5 mm; and wherein the first operating wavelength is 800 nm and the second operating wavelength is 1600 nm.

Another aspect of the disclosure is an optical fiber connector for coupling light to or from another optical fiber connector over a range of operating wavelengths $\lambda$. The connector includes: a first alignment member; a GRIN lens held by the alignment member, the GRIN lens having a front end, a back end and an axial length L, wherein each operating wavelength defines an ideal half-pitch length of the GRIN lens, and wherein the axial length L differs from the ideal half-pitch lengths over the range of operating wavelengths by no more than 0.5%; a field fiber having a front end and held relative to the GRIN lens so that the field fiber front end interfaces with the GRIN lens back end to define a first interface; and wherein the range of operating wavelengths is 800 nm≤$\lambda$≤1600 nm; and wherein GRIN lens and the field fiber define a coupling loss CL between the another optical fiber connector of CL<0.2 dB over the range of operating wavelengths.

Another aspect of the disclosure is a connector assembly wherein one of the above-described optical fiber connectors is operably connected to another optical fiber connector.

Another aspect of the disclosure is a method of optically coupling light within a range of operating wavelengths between an input fiber of a first optical fiber connector and a field optical fiber of a second optical fiber connector. The method includes: interfacing an the input fiber to a front end of a GRIN lens of the second optical fiber connector, the GRIN lens having a back end that interfaces with the field fiber, the GRIN lens having an axial length L, wherein each operating wavelength defines an ideal half-pitch length of the GRIN lens, and wherein the axial length L differs from the ideal half-pitch lengths over the range of operating wavelengths by no more than 0.5%, and wherein the range of operating wavelengths is 800 nm≤$\lambda$≤1600 nm, and wherein the axial length L is in the range 0.5 mm≤L≤5 mm; and transmitting the light between the input fiber and the field fiber through the GRIN lens with a coupling loss CL<0.2 dB over the range of operating wavelengths.

These and other aspects of the disclosure will be further understood and appreciated by those skilled in the art by reference to the following specification, claims and appended drawings.

BRIEF DESCRIPTION OF THE DRAWINGS

A more complete understanding of the present disclosure can be had by reference to the following Detailed Description when taken in conjunction with the accompanying drawings, where.

The symbol "MM" present in certain Figures stands for "multimode."

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The entire disclosure of any publication or patent document mentioned herein is incorporated by reference.
Definitions The symbol "μm" and the word "micron" are used interchangeably herein.

The limits on any ranges cited herein are considered to be inclusive and thus to lie within the range unless otherwise specified.

The operating wavelength λ is the wavelength at which a particular optical fiber operates. Example operating wavelengths include 1310 nm and 1550 nm, which are commonly used in telecommunications systems that include optical fiber connectors of the type disclosed herein. The operating wavelength can be anywhere within a range of operating wavelengths, and in one example the range of operating wavelengths is between 800 nm and 1600 nm. In an example, a given optical fiber can support operation at multiple wavelengths (e.g., via wavelength multiplexing).

The fiber "SMF28" refers to a particular type of conventional, standards-compliant single mode fiber made by Corning, Inc., of Corning, N.Y. The term SFM28 is a registered trademark of Corning, Inc.

The terms "field fiber" and "output fiber" are used herein interchangeably.

Conventional Connector

Figure 1:
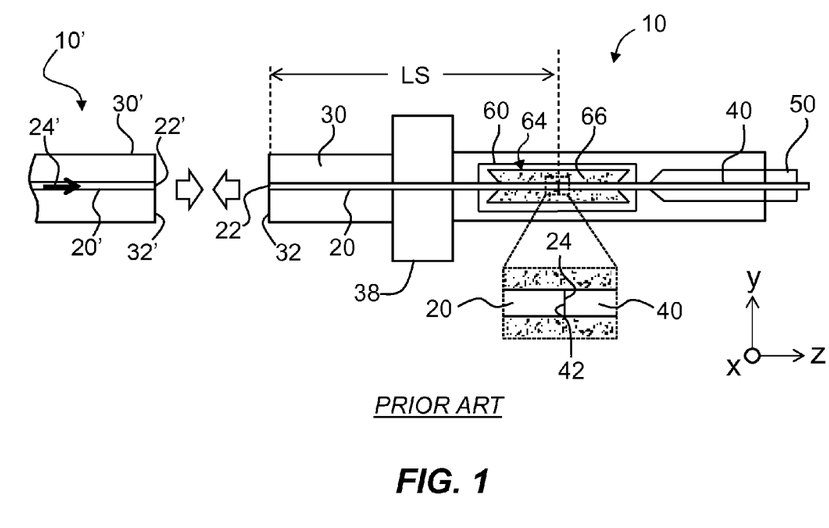
FIG. 1 is a schematic cross-sectional view of an example prior art optical fiber connector that employs a single-mode stub fiber.

FIG. 1 is a schematic cross-sectional diagram of an example conventional field-mountable optical fiber connector ("connector") 10, which is based generally on the Uni-Cam® optical fiber connector from Corning Optical Communications LLC of Hickory, N.C. The connector 10 includes a stub fiber 20 that has opposite ends 22 and 24, and a length LS in the range from 10 mm to 20 mm. The stub fiber 20 is supported by an alignment member 30 (e.g., a ferrule, housing, tube, sleeve, or the like), and in an example the stub fiber is secured therein using, for example, an epoxy. The alignment member 30 has front end 32, which is factory polished so that the corresponding stub fiber end 22 is also polished. In an example, connector 10 includes a radial member 38 spaced apart from front end 32 of alignment member 30 and that radially extends from the alignment member. Radial member 38 can serve as a stopping member when making a connection to another connector. Radial member 38 can also be used to facilitate handling of connector 10.

The connector 10 also includes a field optical fiber ("field fiber") 40 that has an end 42 and that may be operably supported by an alignment member 50, e.g., a ferrule, housing, tube, sleeve or the like. The stub fiber 20 is optically coupled to field fiber 40 by aligning and interfacing the two fibers at their respective ends 24 and 42. This is accomplished, for example, via a mechanical or fusion splice member 60 that includes an interior 64, which in an example contains an index-matching material (e.g., a gel) 66 of refractive index $n_G$. In an example, splice member 60 is within alignment member 30, while in another example the splice member is proximate alignment member 30.

FIG. 1 also shows an end portion of a mating connector 10' configured to mate with connector 10. The mating connector 10' can be a stub-fiber type of connector (e.g., a no epoxy, no polish connector) that includes an alignment member 30' that supports a stub fiber 20' having a front end 22' at a straight facet 32'. The mating connector 10' can be also a regular connector built on a fiber jumper, in which case the optical fiber of the fiber jumper takes the place of stub fiber 20'. Stub fiber 20' is also referred to as an "input fiber," and as noted above field fiber 40 is also referred to herein as an "output fiber" to facilitate the description below and is based on an example embodiment wherein light 24' travels from mating connector 10' to connector 10 or connector 200 (see FIG. 4A, introduced and discussed below). In practice, light 24' can travel between stub fiber 20' and field fiber 40 in either direction.

The coupling loss CL of connector 10 is defined as the amount of light 24' coupled from input fiber 20' to output fiber 40 via stub fiber 20, as compared to the total amount of light 24' carried by the input fiber. In the examples below, the coupling loss CL is measured in decibels (dB) unless otherwise specified.

Achromatic GRIN Lens and Connector

Figure 2:
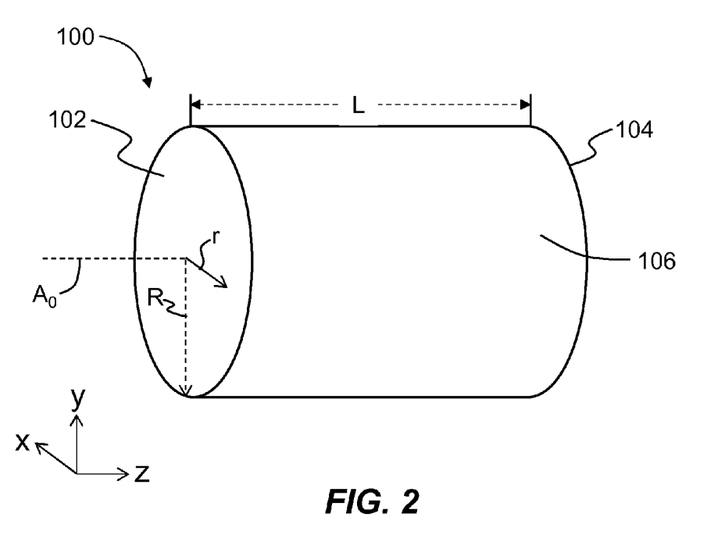
FIG. 2 is an elevated view of an example achromatic gradient-index (GRIN) lens according to the disclosure.

FIG. 2 is an elevated view of an example achromatic gradient-index lens 100 (hereinafter, "GRIN lens 100"). GRIN lens 100 has a central axis $A_0$, a front end 102, a back end 104, an outer surface 106 and an axial length L. In an example GRIN lens 100 has a cylindrical shape with planar front and back ends 102 and 104. A radial coordinate r is shown extending from central axis $A_0$. GRIN lens has a radius R. In an example, the GRIN lens radius R is equal to or greater than the radius of the field (output) fiber 40.

Figure 3A:
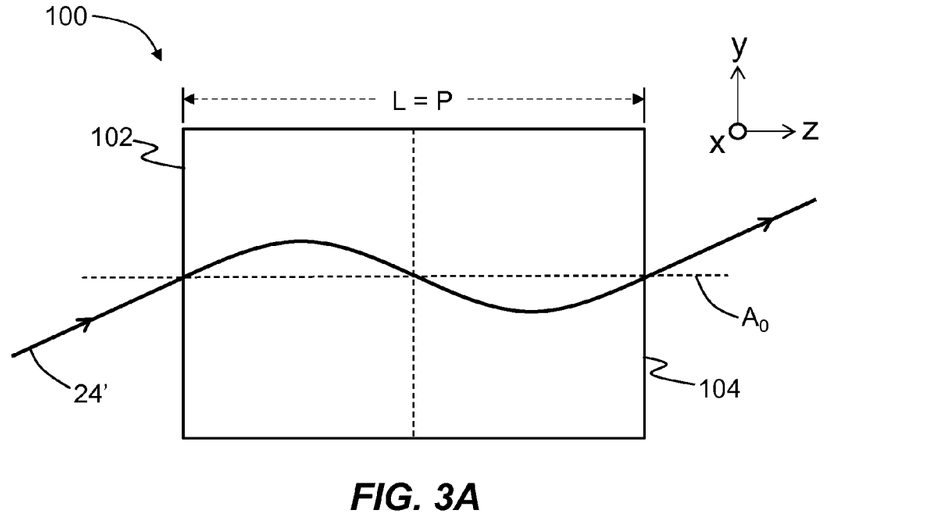
FIGS. 3A and 3B are cross-sectional views of the GRIN lens of FIG. 2, illustrating the light path when the axial length L of the GRIN lens is equal to one period P (FIG. 3A) and when the axial length L is equal to a half period P/2 (FIG. 3B)
Figure 3B:
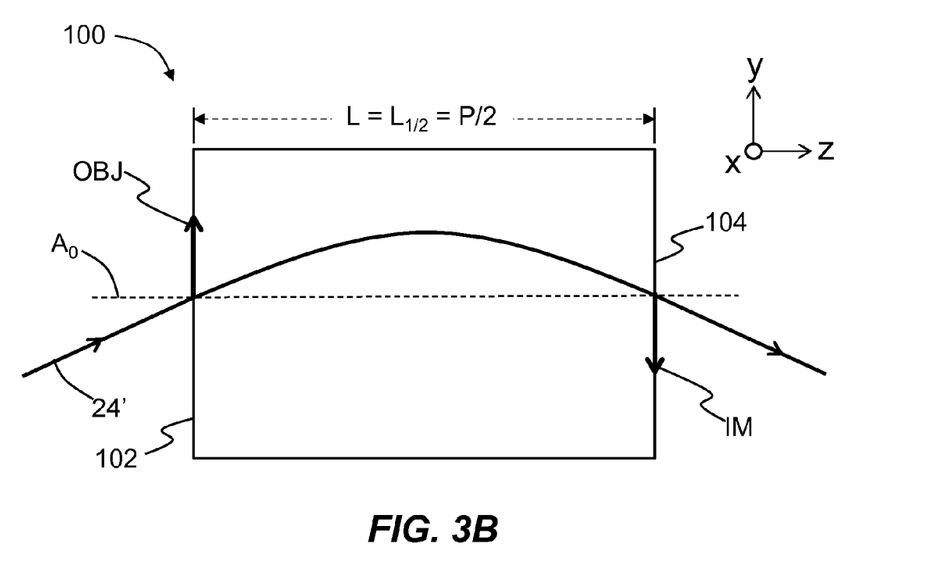

GRIN lens 100 has an index of refraction profile n(r). GRIN lens 100 also has a pitch P defined by the length over which light 24' of a given operating wavelength 2 traverses one period of a sinusoidal path, as illustrated in the cross-sectional view of GRIN 100 of FIG. 3A. Thus, the length L can be defined in terms of the pitch P, e.g., L=P, L=P/2, etc., at a given operating wavelength λ. For GRIN lens 100, L=P/2=$L_{1/2}$, as shown in FIG. 3B. Because GRIN 100 operates over a range of operating wavelengths λ, and because the pitch P depends on the wavelength of light 24', in an example the axial length L=$L_{1/2}$ is defined for a given wavelength with the wavelength range.

When GRIN lens 100 has length L=$L_{1/2}$=P/2, an object OBJ (shown as an arrow) at front end 102 of GRIN lens 100 forms an image IM at back end 104 with −1× magnification. While the length L for GRIN lens 100 can be L=P or any half-multiple of P (e.g., 3P/2, 2P, etc.), optical aberrations accumulate with the distance that light 24' travels through the GRIN lens. Thus, GRIN lens 100 with length $L_{1/2}$=P/2 will generally have better performance since the accumulation of aberrations is kept to a minimum.

In an example, the length L of GRIN lens 100 is in the range from 0.5 mm to 5 mm, and further in an example is nominally 1 mm. This length L is thus substantially smaller than the 10 mm to 20 mm length of a conventional stub fiber 20, so that the resulting connector 200 is substantially smaller. Smaller connectors 200 have reduced cost and are easier to fit into smaller spaces. In an example, GRIN lens 100 does not include an outer cover or cladding on surface 106, and this case is illustrated in FIG. 2.

Figure 4A:
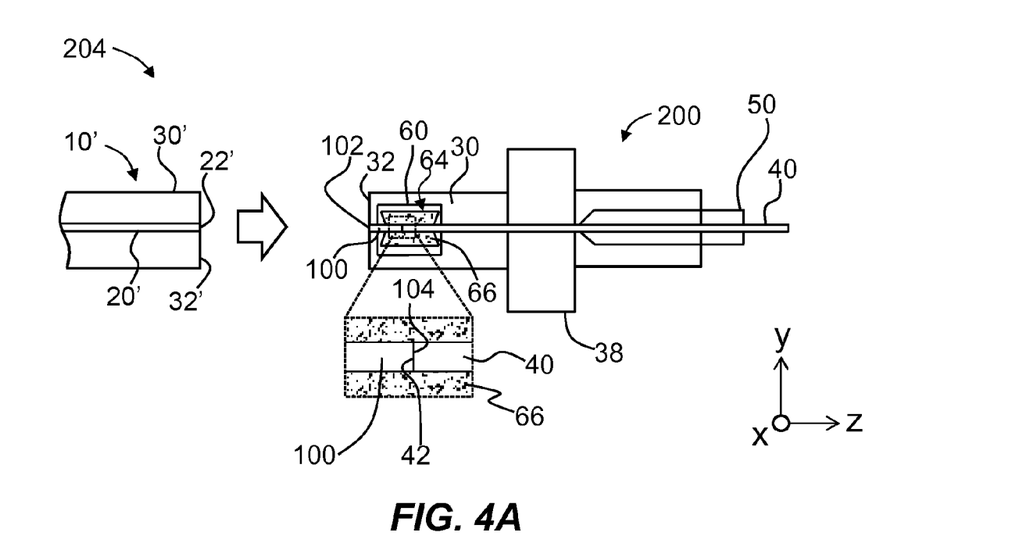
FIG. 4A is a schematic cross-sectional view of an example optical fiber connector that employs the GRIN lens of FIG. 2.

FIG. 4A is similar to FIG. 1 and shows an example connector 200 wherein GRIN lens 100 replaces the stub fiber 20 held by alignment member 30. Splice member 60 serves to optically couple GRIN lens 100 to output fiber 40. Because the length L of GRIN lens 100 is substantially shorter than that of a conventional stub fiber, splice member 60 is located much closer to front end 32 of alignment member 30 than for the conventional connector 10. Connector 200 and connector 10' can matingly engaged so that the front end 22' of stub fiber 20 interfaces the front end 102 of GRIN lens 100, thereby defining a connector assembly 204.

The coupling loss CL of connector 200 is defined as the amount of light 24' coupled from input fiber 20' to output fiber 40 via GRIN lens 100, as compared to the total amount of light 24' carried by the input fiber. The term "coupling loss" is also referred in the art as the "insertion loss."

The use of GRIN lens 100 enables connector 200 to work with both single-mode and multimode fibers and to operate over a relatively wide range of operating wavelengths, as discussed in greater detail below. The GRIN lens 100 thus serves as a "universal stub" that simplifies the field installation of connector 200 by eliminating the need to identify the type of fiber to be connectorized, as well as the operating wavelength λ.

GRIN lens 100 is configured to be achromatic, i.e., corrected over a relatively wide range of wavelengths. In an example, GRIN lens 100 is achromatic over a wavelength band Δλ=$λ_2$−$λ_1$, where $λ_1$=800 nm and $λ_2$=1600 nm. In another example, $λ_1$=1300 nm and $λ_2$=1550 nm. The chromatic variation in half-pitch length (L=P/2) of a GRIN lens 100 determines the usable wavelength band Δλ that can be accommodated in terms of coupling between input fiber 20' and output fiber 40.

Figure 4B:
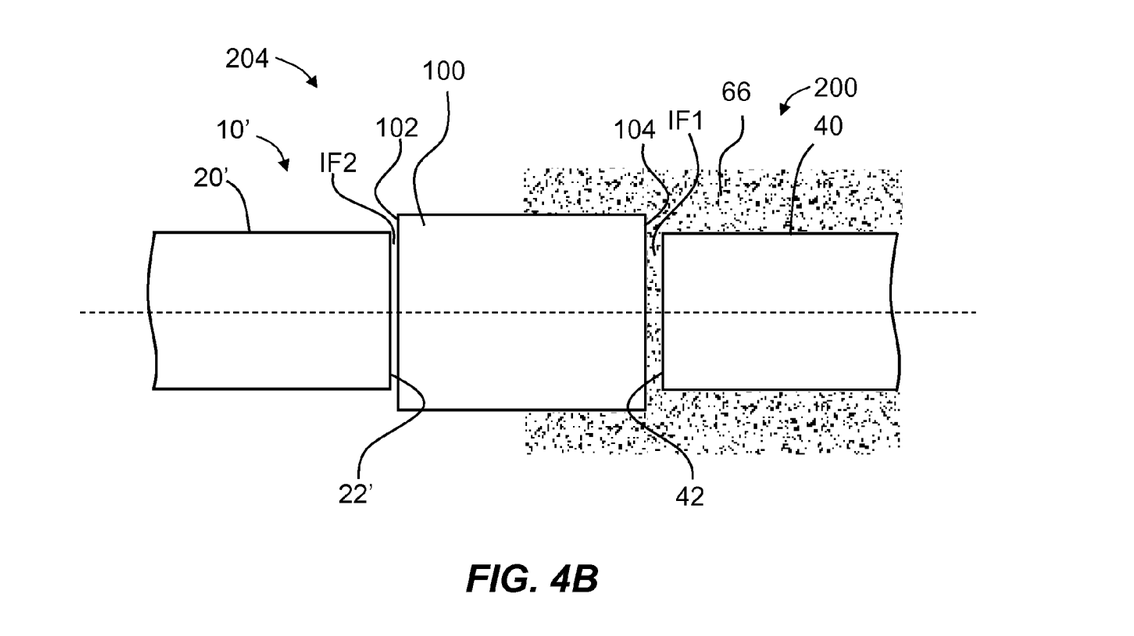
FIG. 4B is a close-up cross-sectional view of the stub (input) fiber of a first optical fiber connector interfaced with the front end of the GRIN lens of the optical fiber connector of FIG. 4A to form a connector assembly.

FIG. 4B is a close-up cross-sectional view of a portion of connector 200 and connector 10' when the two connectors are connected to form connector assembly 204. FIG. 4B shows input fiber 20' interfaced with GRIN lens 100 at their respective front ends 22' and 102, and also shows the front end of output fiber 40 interfaced with the back end 104 of the GRIN lens. The index-matching gel 66 is shown covering a first or output interface IF1, i.e., the interface between GRIN lens 100 and output fiber 40, as well as covering respective portions of the GRIN lens and the output fiber. In an example, output interface IF1 can include index-matching gel 66. Front end 102 of GRIN lens 100 and front end 22' of input fiber 20' define an input or second interface IF2.

Figure 5A:
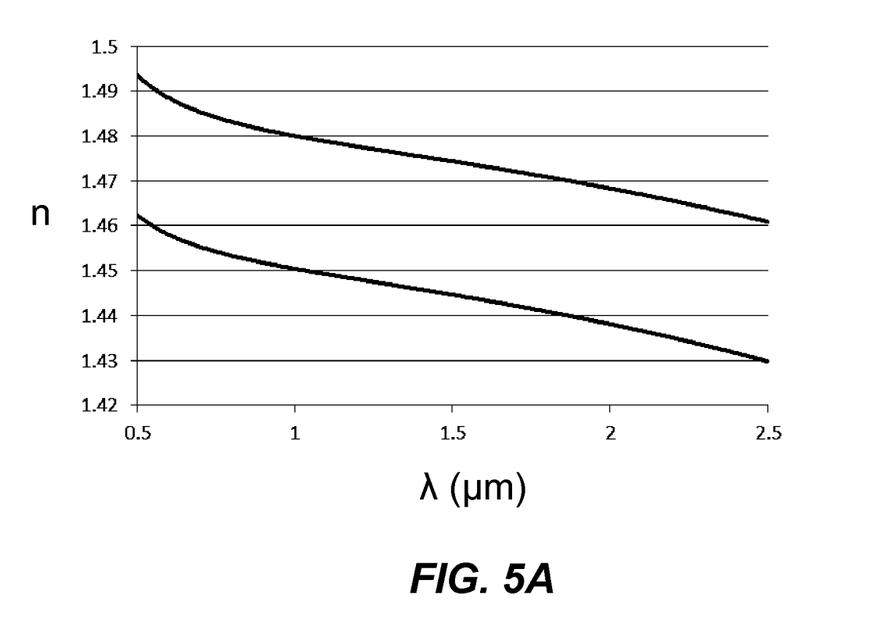
FIG. 5A is a plot of the index of refraction n versus wavelength ($\mu$m) for $SiO_2$ (lower curve) and 20 mo % $SiO_2$—$GeO_2$ (upper curve)
Figure 5B:
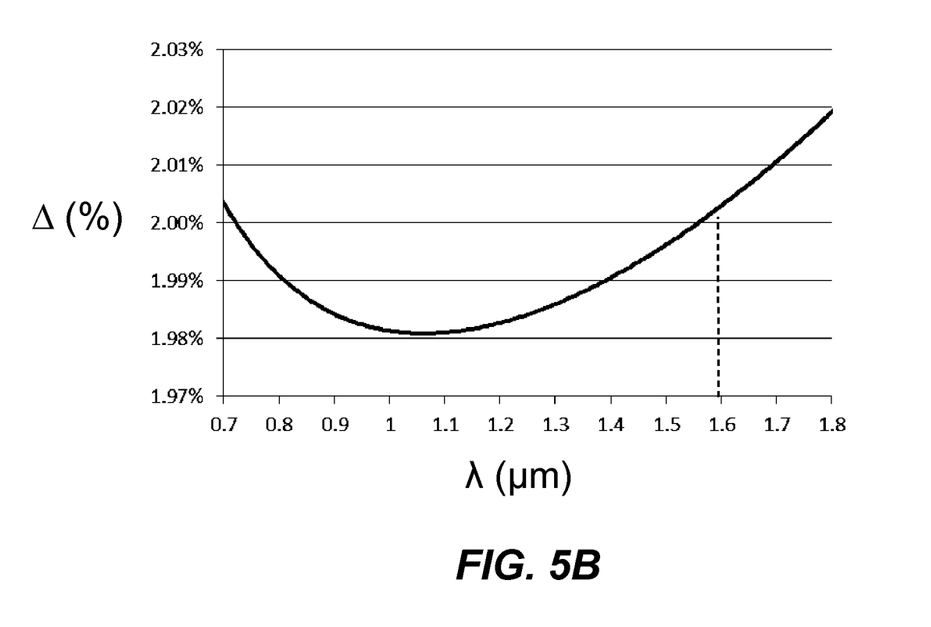
FIG. 5B is a plot of the refractive index delta $\Delta$ (%) versus wavelength ($\mu$m), illustrating how the GRIN lens made of $SiO_2$—$GeO_2$ have a relatively small variation in $\Delta$ of about 0.02% over a relatively wide range of wavelengths, including the range from 800 nm to 1600 nm.

In an example, GRIN lens 100 is made of $SiO_2$ (silica) doped with $GeO_2$ (germania) to define the GRIN profile n(r). FIG. 5A is a plot of the index of refraction n versus wavelength λ (λm) for silica (lower curve) and for 20 mol % silica-germania (upper curve), and represents dispersion curves for the two materials. FIG. 5B is a plot of the index delta Δ (%) as a function of wavelength λ (λm). The index delta is defined as Δ=($n_1^2$−$n_2^2$)/$2n_1^2$ where $n_1$ is the refractive index at central axis $A_0$ (i.e., at r=0) and $n_2$ is the refractive index at the edge of the GRIN lens (i.e., at r=R).

Although the refractive index n depends strongly on wavelength, FIG. 4B indicates that the index Δ has a substantially flat response over the entire 800 nm-1600 nm wavelength band of interest, with a variation in Δ of about 0.02%. The fact that the wavelength dependence on Δ is relatively small over the entire wavelength range (wavelength band) between 800 nm-1600 nm indicates that the variation in half-pitch length $L_{1/2}$ over this wavelength range is also relatively small.

The half-pitch length $L_{1/2}$=π·R·{N/[2·($n_1$−$n_2$)]}$^{1/2}$, where N is the coefficient of the parabolic index function describing the refractive index gradient. The small variation in the ideal half-pitch length $L_{1/2}$ can be seen in the first two columns Table 1 below, which sets forth the ideal half-pitch length for the GRIN lens 100, as well as for a conventional GRIN lens from Nippon Sheet Glass (NSG) of Tokyo, Japan, for example wavelengths and values of the index delta.

TABLE 1

| λ | $L_{1/2}$ for $SiO_2$/$GeO_2$, R = 0.0625 mm | | $L_{1/2}$ for NSG (R = 0.9 mm) |
|---|---|---|---|
| | Δ = 1% | Δ = 2% | |
| 850 nm | 1.383 mm | 0.976 mm | 9.46 mm |
| 1300 nm | 1.383 mm | 0.976 mm | 9.59 mm |
| 1550 nm | 1.378 mm | 0.973 mm | 9.62 mm |

Table 1 shows that the variation in the ideal half-pitch length $L_{1/2}$ as a function of operating wavelength λ is very small for both index deltas of Δ=1% and Δ=2%. The half-pitch length $L_{1/2}$ for the commercially available NSG GRIN lens has a much larger radius R of 0.9 mm than for GRIN lens 100, which in an example has a radius R in the range from 50 μm to 80 μm, an in specific examples has a radius R of either 50 μm, 62.5 μm or 80 μm.

Also, the variation in the ideal half-pitch length $L_{1/2}$ as a function of operating wavelength λ is about 0.4% for GRIN lens 100 over the wavelength range, as compared to a variation of about 1.7% for the conventional NSG GRIN lens. In an example, the actual half-pitch length $L_{1/2}$ for GRIN lens 100 is selected to minimize the coupling loss over the wavelength range. In an example embodiment, the half-pitch length $L_{1/2}$ of GRIN lens 100 differs by no more than 0.5% from the ideal half-pitch length as calculated for each wavelength in the range of operating wavelengths. In an example, the amount of chromatic aberration in GRIN lens 100 is such that the focal length of the GRIN lens changes by no more than ±15 μm.

Coupling Loss

To quantify the effect that the variation in the ideal half-pitch length with the operating wavelength λ has on the performance on connector 200, the coupling loss CL for the connector was analyzed using computer simulations for different embodiments of GRIN lens 100, as well as for the conventional NSG GRIN lens. The length L of GRIN lens 100 was chosen to be exactly a half-pitch (i.e., $L_{1/2}=P/2$) at an operating wavelength of λ=1300 nm. The coupling loss CL for a connection between GRIN lens 100 and each of three different types of input and output fibers 20' and 40 was evaluated. The three types of fibers were single-mode SMF28 fiber and multimode fibers having radii of 50 μm and 62.5 μm, respectively. The same evaluation was performed for the conventional NSG GRIN lens The results of the coupling loss analysis are summarized in Table 2, below. The first three columns of Table 2 show that GRIN lens 100 has very low coupling loss CL over a large range of wavelengths (850 nm, 1300 nm and 1550 nm) due to the small chromatic aberration. The last three columns of Table 2 show the coupling loss CL for the NSG GRIN lens. Although SMF28 fiber would not normally be used at 850 nm, the high loss at this wavelength for the NSG GRIN lens is indicative of large chromatic aberration. Even at 1300 nm, the coupling loss CL for coupling multimode fibers with the NGS GRIN lens is significant due to spherical aberration.

TABLE 2

| | GRIN lens 100 | | | NSG GRIN lens (R = 0.9 mm) | | |
|---|---|---|---|---|---|---|
| λ (nm) | CL for SMF 28 Δ = 2% | CL for MMF R = 50 um Δ = 1% | CL for MMF R = 62.5 um Δ = 2% | CL for SMF 28 | CL for MMF R = 50 um | CL for MMF R = 62.5 um |
| 850 | 0.0 dB | <0.1 dB | <0.1 dB | 4.0 dB | 2.6 dB | 3.4 dB |
| 1300 | 0.0 dB | <0.1 dB | <0.1 dB | 0.0 dB | 0.5 dB | 1.1 dB |
| 1550 | 0.0 dB | — | — | 0.1 dB | — | — |

Figure 6A:
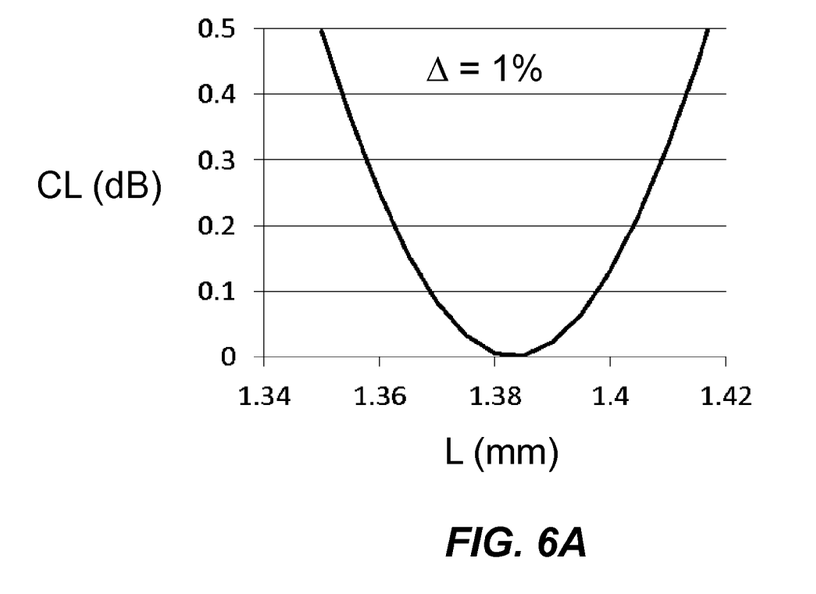
FIGS. 6A and 6B are plots of the single-mode coupling loss CL (dB) versus axial length L (mm) of the GRIN lens for an index delta of $\Delta$=1% (FIG. 6A) and for an index delta of $\Delta$=2% (FIG. 6B)
Figure 6B:
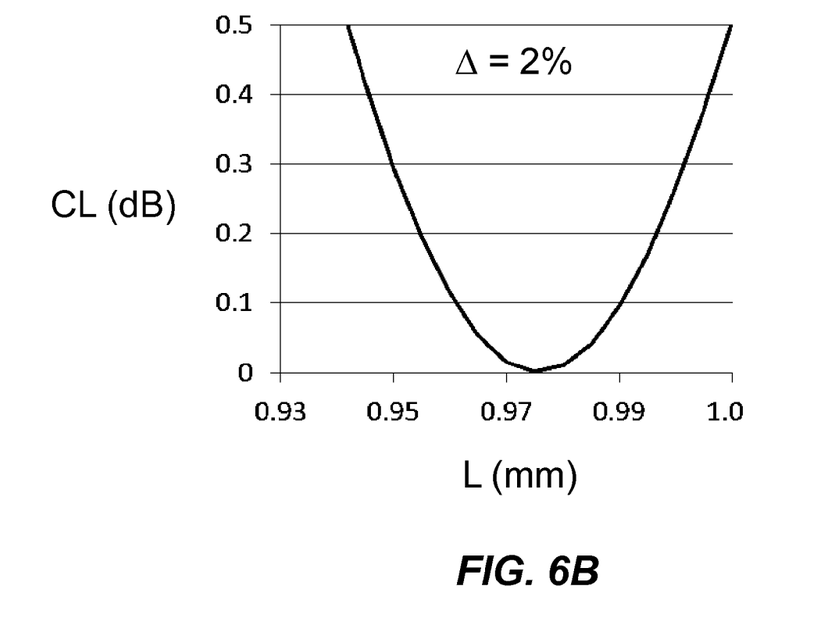

FIG. 6A is a plot of the single-mode coupling loss CL (dB) versus the length L (mm) of GRIN lens 100 having an index delta of Δ=1%, while FIG. 6B is the same plot but for an index delta of Δ=2%. The coupling loss plots show that an error in length L of GRIN lens 100 of ±15 μm results in only a 0.1 dB coupling loss for both the Δ=1% and Δ=2% cases.

Figure 7A:
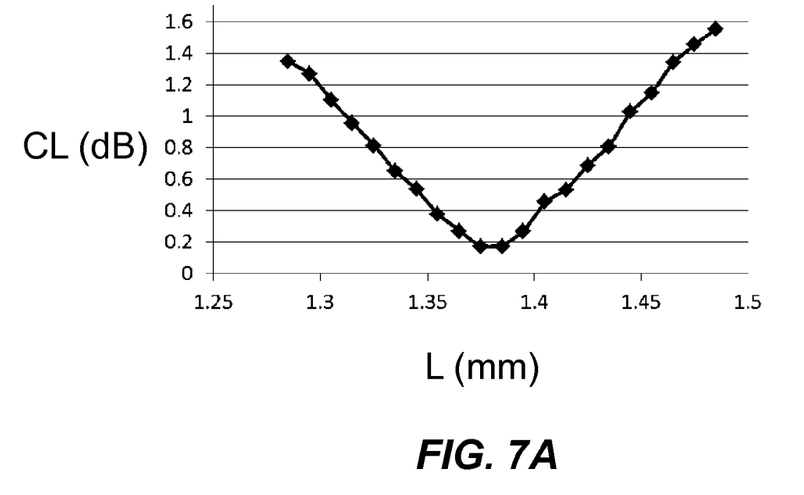
FIGS. 7A through 7C are plots of multimode coupling loss CL (dB) versus the length L (mm) of GRIN lens similar to FIGS. 6A and 6B, but wherein the GRIN lens has a non-optimal length L and for different input and output fibers and different values of the index delta.
Figure 7B:
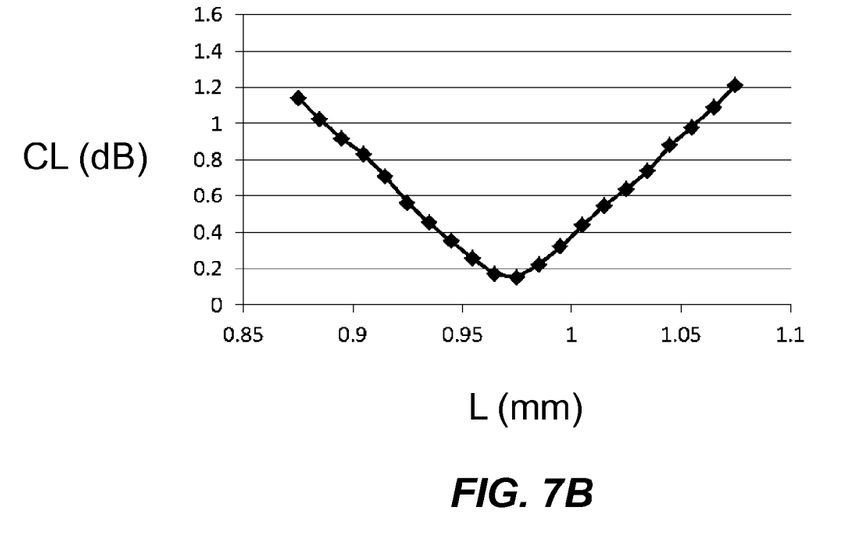
Figure 7C:
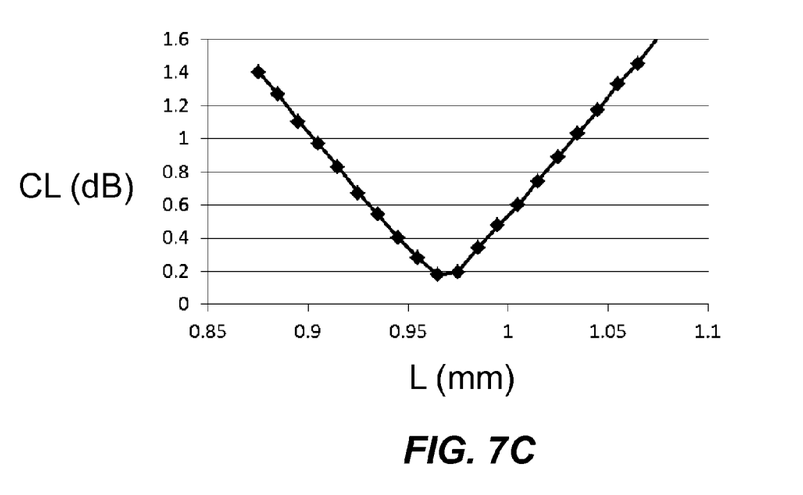

FIGS. 7A through 7C are plots of coupling loss CL (dB) versus the length L (mm) of GRIN lens 100 and are similar to FIGS. 6A and 6B, but wherein GRIN 100 has a non-optimal length L, e.g., close to but not exactly P/2. FIG. 7A shows the coupling loss CL when connector 200 with GRIN lens 100 having Δ=1% is used to connect multimode input and output fibers 20' and 40 each having a diameter of 50 μm and a NA=0.2.

FIG. 7B is the same as FIG. 7A, but for the case where GRIN lens 100 has an index delta of Δ=2%. FIG. 7C shows the coupling loss CL when the input and output fibers 20' and 40 have a radius of 62.5 μm and a NA=0.29, and where GRIN lens 100 has an index delta of Δ=2%. The results of FIGS. 7A through 7C were obtained using ray-trace analysis, and the coupling loss CL is artificially inflated by about 0.15 dB due to the ray-based launch conditions.

For each of the three cases in FIGS. 7A through 7C, the coupling loss CL<0.1 dB near the half-pitch length $L_{1/2}$. The loss difference between the half-pitch length $L_{1/2}$ and other lengths can be compared. For each of these cases, the increase in coupling loss CL is nearly the same as length L deviates from the ideal half-pitch length P/2. The coupling configuration of connector 200 with GRIN lens 100 having Δ=2% and R=50 μm coupled to multimode fibers 20' and 40 with NA=0.2 is slightly more tolerant to errors in the length L of GRIN lens 100 than the other configurations.

Figure 8A:
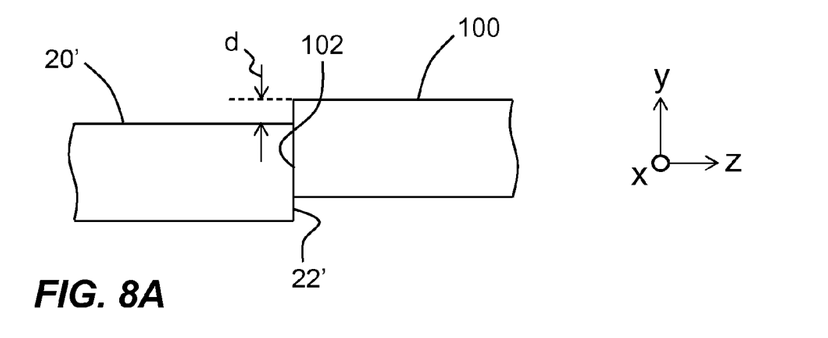
FIG. 8A is a close-up cross-sectional view of portions of the input fiber and the GRIN lens illustrating how the input fiber and GRIN lens can be laterally offset relative to one another.
Figure 8B:
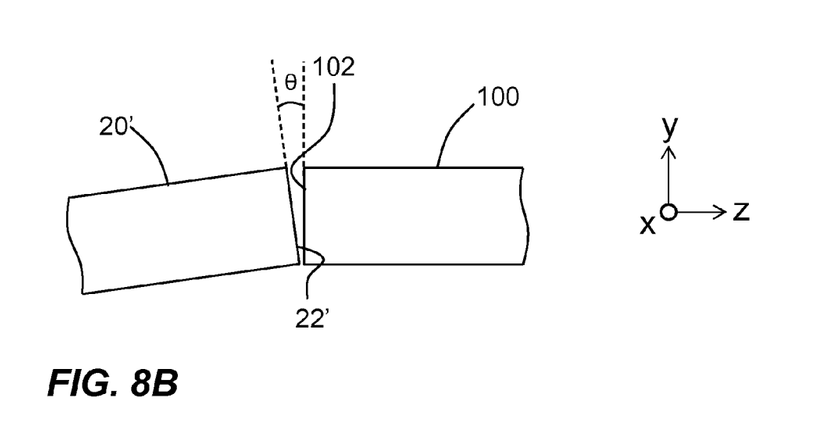
FIG. 8B is similar to FIG. 8A and illustrates how the input fiber and GRIN lens can have an angular offset (tilt) relative to one another.

Two other sources of coupling loss CL in connector 200 include lateral offset and angular tilt between the input fiber 20' and GRIN lens 100 and/or GRIN lens 100 and the output fiber 40. FIG. 8A is a close-up view of input fiber 20' and GRIN lens 100 showing an example lateral offset d in the y-direction. FIG. 8B is similar to FIG. 8A and shows an example angular offset (tilt) θ in the y-z plane (i.e., rotation about an axis in the x-direction). More complicated lateral offsets and angular offsets are possible. Like offsets can occur between back end 104 of GRIN lens 100 and front end 42 of output fiber 40.

The imaging properties of GRIN 100 are nearly perfect when input fiber 20 has a low NA, such as when the input fiber is a single-mode fiber. Consequently, the coupling loss CL incurred between single-mode input and output fibers 20' and 40 used with GRIN lens 100 and with lateral and/or angular misalignments can be obtained using the equations for butt splices between single-mode fibers. Such equations are provided, for example, in the publication by D. Marcuse, "Loss analysis of single-mode fiber splices," BSTJ, vol. 56, no. 5, pp. 703-718, 1977.

Figure 9A:
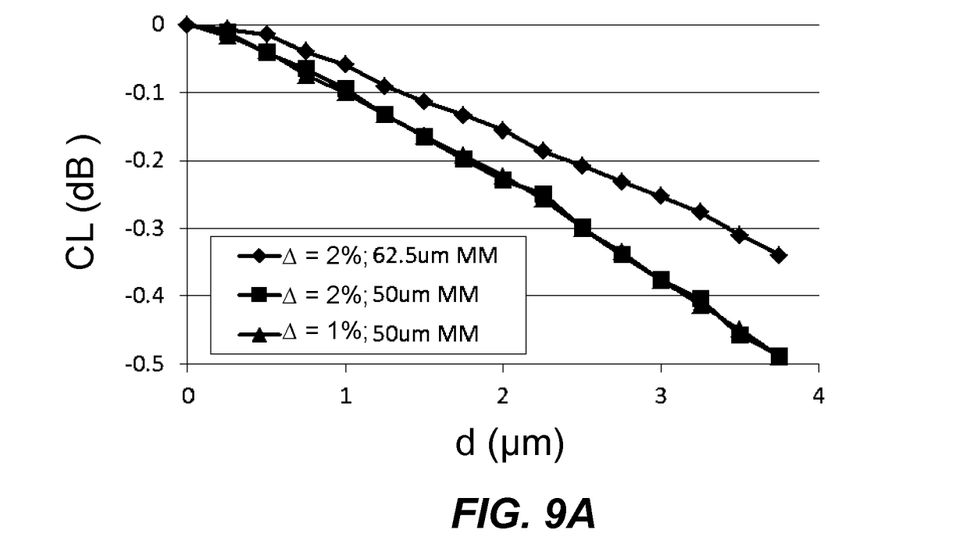
FIGS. 9A and 9B are plots of the coupling loss CL (dB) versus lateral offset d (λm) for different values of the index delta and for different sizes of multimode input and output fibers, with FIG. 9B having a larger range for the lateral offset.
Figure 9B:
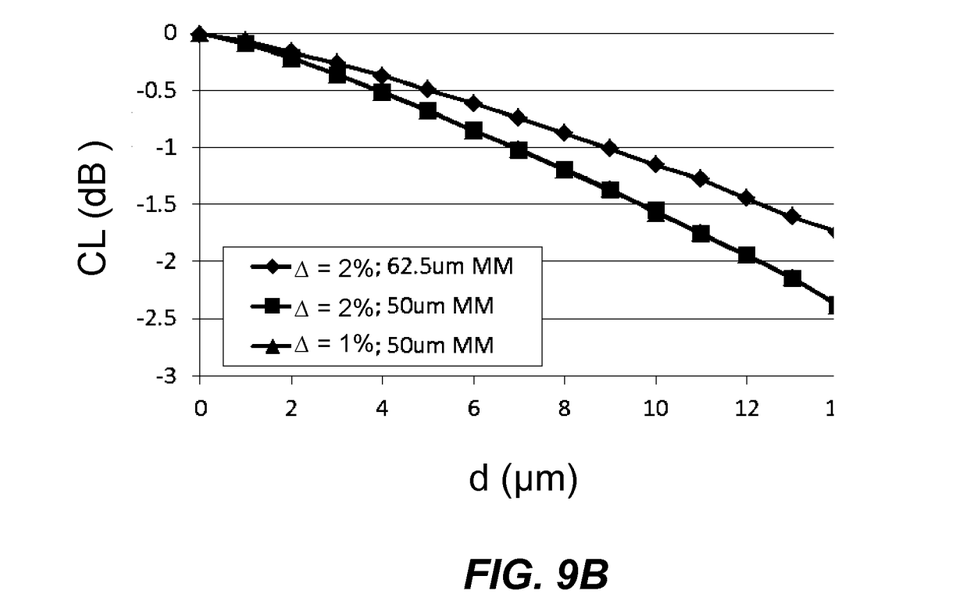

FIGS. 9A and 9B plot the coupling loss CL (dB) versus lateral offset d (μm) between input fiber 20' and front end 102 of GRIN lens 100 when using connector 200 to couple between input and output multimode fibers 20' and 40 (see FIG. 4), with FIG. 8B having an expanded lateral offset scale. The plots of FIGS. 9A and 9B show that the tolerance on the lateral offset d for multimode fibers with a radius of 62.5 μm and a NA of 0.29 is somewhat greater than for multimode fibers with a radius of 50 μm and a NA of 0.2.

Figure 10A:
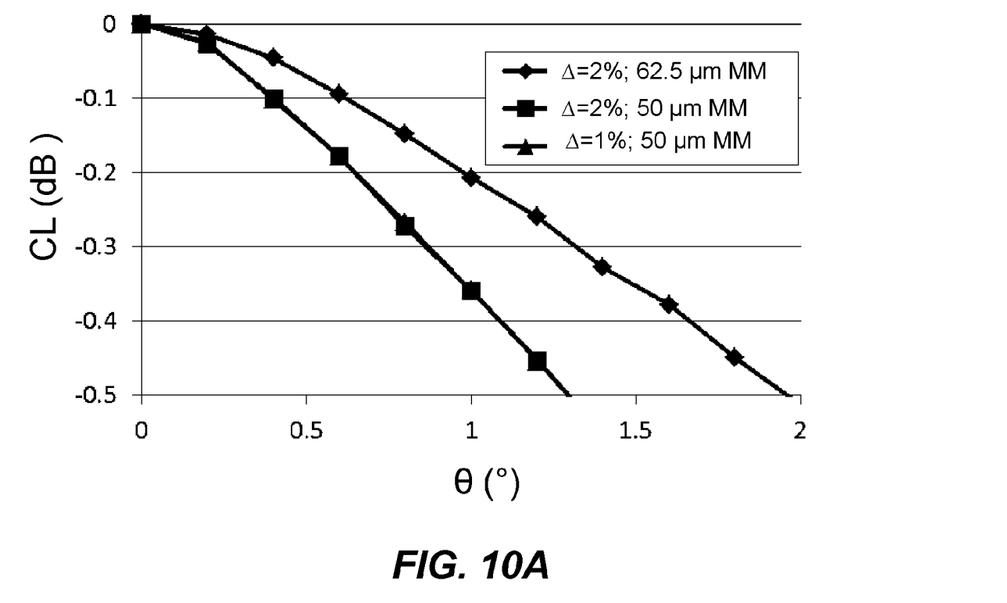
FIGS. 10A and 10B are plots of the coupling loss CL (dB) versus angular tilt (degrees) for different values of the index delta and for different sizes of multimode input and output fibers, with FIG. 10B having a larger range for the angular tilt.
Figure 10B:
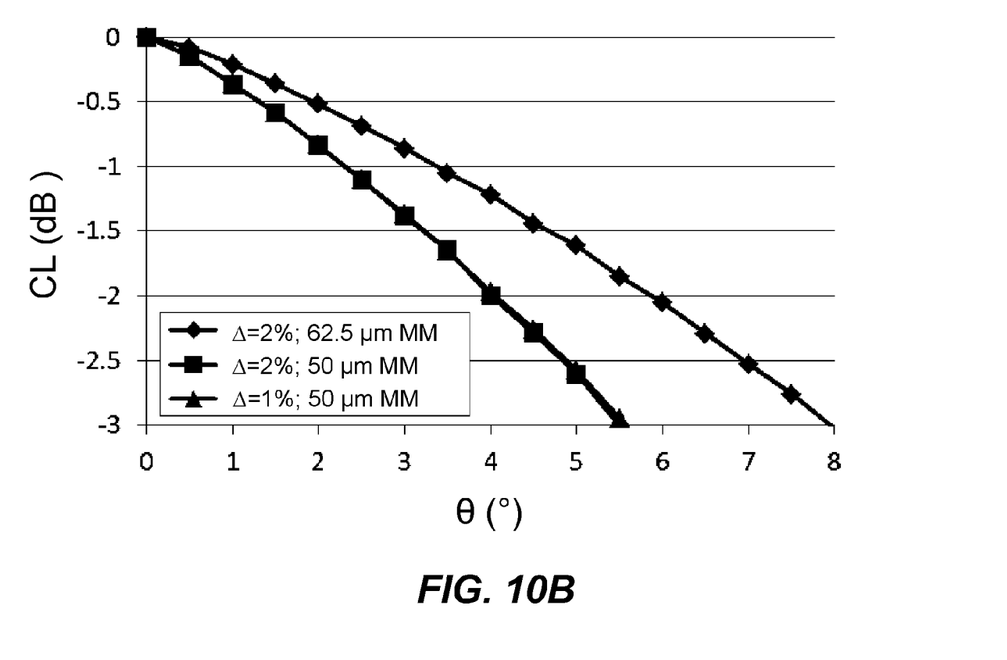

FIGS. 10A and 10B plot the coupling loss CL (dB) versus angular tilt θ (degrees) between input fiber 20' and front end 102 of GRIN lens 100 when using connector 200 to couple between multimode fibers 20' and 40 (see FIG. 4), with FIG. 10B having an expanded lateral offset scale. The plots of FIGS. 10A and 10B show that the tolerance on the angular tilt θ for 62.5 μm, 0.29 NA multimode fibers is somewhat greater than that for 50 μm, 0.2 NA multimode fibers.

Figure 11:
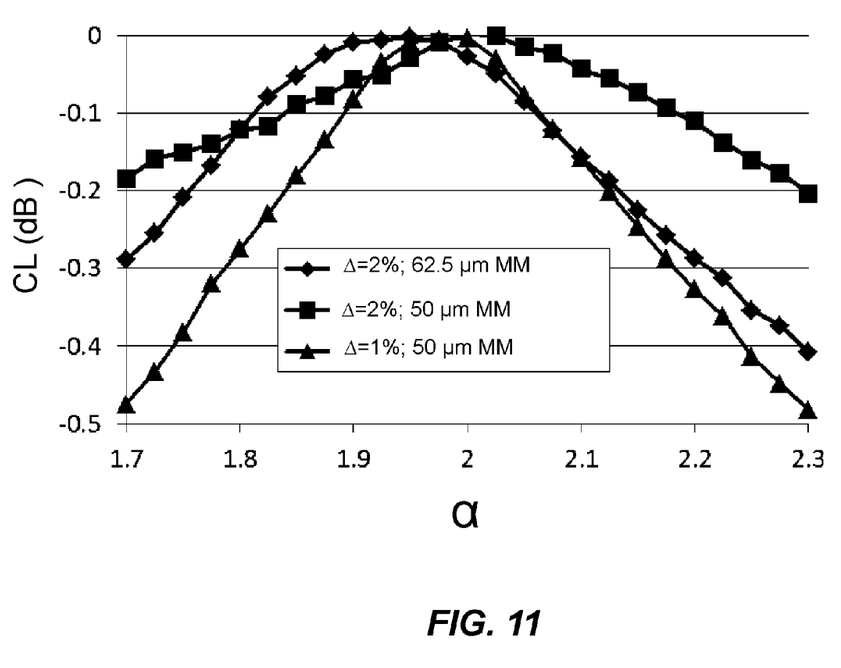
FIG. 11 is a plot of the coupling loss CL (dB) versus the alpha value a for different values of the index delta and for different sizes of multimode input and output fibers.

As noted above, GRIN lens 100 has an index profile n(r). In an example, this index profile is defined by the equation $n(r)=n_1\cdot(1\cdot Ar^{\alpha})$, where A is a constant, and α is a parameter (called the "alpha parameter") that determines the shape of the index profile. For excellent paraxial imaging, the index profile n(r) is parabolic, which corresponds to α=2. FIG. 11 plots the coupling loss CL (dB) versus the alpha parameter α to illustrate the sensitivity of the coupling loss CL of connector 200 (when connecting multimode input and output fibers 20' and 40) to the deviation in a from the ideal value of α=2. Deviations in a on the order of a few tenths have a very small impact on the coupling loss CL. Since the alpha parameter of the parabolic index profile n(r) can be controlled to much better than a few tenths, the impact of an alpha error in GRIN lens 100 on the performance of connector 200 is negligible.

Figure 12A:
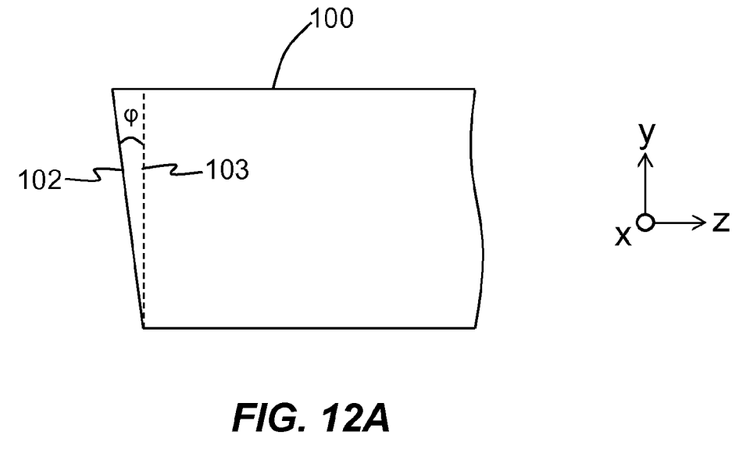
FIG. 12A is a close-up cross-sectional view of the front end of the GRIN lens illustrating an endface angle φ.
Figure 12B:
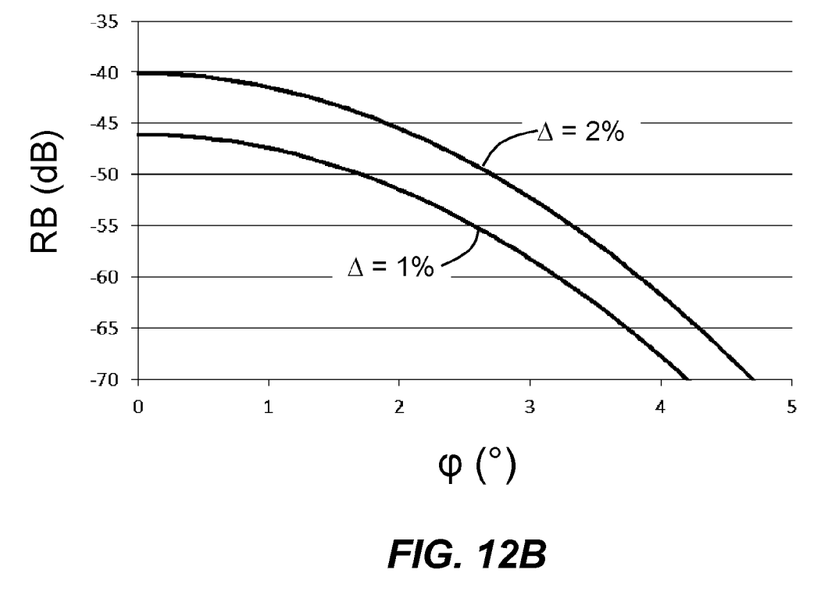
FIG. 12B is a plot of the back reflectance RB (dB) versus endface angle φ for GRIN lens having an index delta of Δ=1% and Δ=2%.

With reference again to FIGS. 4A and 4B, back reflection can arise in connector assembly 204 from an index mismatch between input fiber 20' and front end 102 of GRIN 100, as well as from an index mismatch between back end 104 of GRIN 100 and output fiber 40. This loss is a function of an endface angle φ of front end 102 of GRIN 100, as shown in the close-up view of FIG. 12A. Endface angle φ is measured relative to the x-y plane, i.e., a non-angled front end (endface) 102. FIG. 12B is a plot of the back reflectance RB (dB) as a function of endface angle φ (degrees) at front end 102 of GRIN lens 100 as calculated using the Fresnel reflection coefficients Although dependent on particular application for connector 200 and connector assembly 204, an acceptable level of back reflection RB for single-mode input and output fibers 20' and 40 is typically −45 dB or better. For the case GRIN lens 100 with an index delta of Δ=1%, even a flat end face (i.e., $\phi=0°$) is acceptable. However, when the index delta is Δ=2%, an endface angle $\phi=2°$ is needed to meet the −45 dB back reflection requirement.

When connector 200 is used with multimode fibers 20' and 40, the back reflection RB is typically not problematic when $\phi=0°$ for two reasons: i) the back reflection requirement for multimode fibers is not as stringent as for single-mode fibers, and ii) the index mismatch between a multimode fiber and GRIN 100 is smaller than for a single-mode fiber, resulting in a smaller back reflection RB.

A Monte Carlo analysis was used to model the coupling loss CL based on the above sources of coupling loss (i.e., variations in offset d, GRIN lens length L and tilt angle θ) to illustrate the expected performance of a population of couplers 200. The following three coupling configurations were examined.

Configuration 1: Input fiber 20' with R=62.5 µm, NA=0.29 NA; GRIN lens 100 with Δ=2%.

Configuration 2: Input fiber 20' with R=50 µm, NA=0.2; GRIN lens 100 with Δ=2%.

Configuration 3: Input fiber 20' with R=50 µm, NA=02; GRIN lens with Δ=1%.

In the Monte Carlo simulations, the nominal design has zero lateral offset d, zero angular tilt θ and a half-pitch GRIN length L. Lateral offsets dx and dy had a Gaussian distribution about zero with a sigma of 0.3 µm. Likewise, the angular tilt θ had a Gaussian distribution about zero with a sigma of 0.3 degrees. The variation in GRIN length L was a Gaussian distribution (about the half-pitch length) with a sigma of 5.0 µm.

Figure 13:
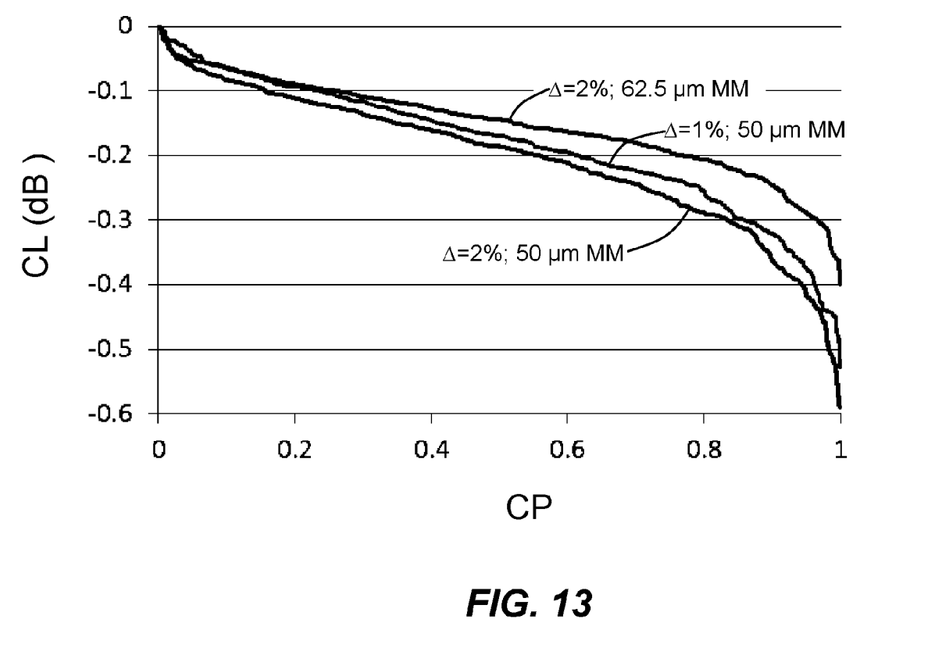
FIG. 13 is a plot of the coupling loss CL (dB) versus the cumulative probability CP as determined using a Monte Carlo analysis for different values of the index delta and for different sizes of multimode input and output fibers.

FIG. 13 is a plot of the coupling loss CL (dB) as a function of the cumulative probability CP based on 400 simulations for each of the three different configurations for connector 200. FIG. 13 shows that the performance of Configuration 1 had slightly better performance that the other two configurations for a given value of the cumulative probability CP. The median coupling loss CL for each configuration was calculated as follows: Configuration 1: 0.14 dB; Configuration 2: 0.19 dB; and Configuration 3: 0.17 dB. In an example embodiment, connector 200 defines a coupling loss CL for connector assembly 204 of CL<0.2 dB.

It will be apparent to those skilled in the art that various modifications to the preferred embodiment of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber connector for coupling light to or from an input fiber over a range of operating wavelengths between first and second operating wavelengths, comprising:
   a first alignment member;
   a gradient-index (GRIN) lens held by the alignment member, the GRIN lens having a front end, a back end, and an axial length L that is substantially equal to P/2, where P is a length over which the light with the range of operating wavelengths traverses one period of a sinusoidal path through the GRIN lens, and wherein 0.5 mm≤L≤5 mm;
   a field fiber that interfaces with the back end of the GRIN lens to define a first interface, wherein the GRIN lens and the field fiber define a coupling loss CL between the input fiber and the field fiber, and wherein the coupling loss CL<0.2 dB over the range of wavelengths;
   a splice member within or proximate the first alignment member, the splice member configured to operably align the GRIN lens and the field fiber at the first interface; and
   wherein the first operating wavelength is 800 nm and the second operating wavelength is 1600 nm.

2. The optical fiber connector according to claim 1, wherein the GRIN lens comprises SiO2 doped with GeO2.

3. The optical fiber connector according to claim 1, wherein the GRIN lens has an index delta of either Δ=1% or Δ=2%.

4. The optical fiber connector according to claim 1, wherein the axial length L differs from ideal half-pitch lengths over the range of operating wavelengths by no more than 0.5%.

5. The optical fiber connector according to claim 1, wherein the field fiber has a radius and the GRIN lens has a radius that is equal to or greater than the field fiber radius.

6. The optical fiber connector according to claim 1, wherein the splice member includes an interior containing an index-matching gel, and wherein the interior contains the first interface.

7. A connector assembly, comprising:
   the optical fiber connector of claim 1 that defines a first optical fiber connector; and
   a second optical fiber connector having the input fiber, wherein input fiber has a front end and wherein the first and second optical fiber connectors are matingly engaged so that the input fiber front end interfaces with the GRIN lens front end.

8. The optical fiber connector according to claim 1, wherein the splice member includes an interior containing an index-matching gel, and wherein the interior contains the first interface.

9. An optical fiber connector for coupling light to or from another optical fiber connector over a range of operating wavelengths λ, comprising:
   a first alignment member;
   a gradient-index (GRIN) lens held by the alignment member, the GRIN lens having a front end, a back end and an axial length L, wherein each operating wavelength defines an ideal half-pitch length of the GRIN lens, and wherein the axial length L differs from the ideal half-pitch lengths over the range of operating wavelengths by no more than 0.5%;
   a field fiber having a front end and held relative to the GRIN lens so that the field fiber front end interfaces with the GRIN lens back end to define a first interface; and
   a splice member within or proximate the first alignment member, the splice member configured to operably align the GRIN lens and the field fiber at the first interface;
   wherein the range of operating wavelengths is 800 nm≤λ≤1600 nm; and
   wherein GRIN lens and the field fiber define a coupling loss CL between the another optical fiber connector of CL<0.2 dB over the range of operating wavelengths.

10. The optical fiber connector of claim 9, wherein the axial length L is in the range 0.5 mm≤L≤5 mm.

11. The optical fiber connector according to claim 9, wherein the GRIN lens comprises SiO2 doped with GeO2.

12. The optical fiber connector according to claim 9, wherein the GRIN lens has an index delta of either Δ=1% or Δ=2%.

13. The optical fiber connector according to claim 9, wherein the GRIN lens has a nominal radius of either 50 µm, 62.5 µm or 80 µm.

14. A connector assembly, comprising:
the optical fiber connector of claim 9 matingly engaged with the another optical fiber connector.

15. A method of optically coupling light within a range of operating wavelengths between an input fiber of a first optical fiber connector and a field optical fiber of a second optical fiber connector, comprising:
interfacing an the input fiber to a front end of a gradient-index (GRIN) lens of the second optical fiber connector, the second optical fiber connector including a splice member within or proximate a first alignment member, the spice member operably aligning the GRIN lens with the field fiber of the second optical fiber connector, the GRIN lens having a back end that interfaces with the field fiber, the GRIN lens having an axial length L, wherein each operating wavelength defines an ideal half-pitch length of the GRIN lens, and wherein the axial length L differs from the ideal half-pitch lengths over the range of operating wavelengths by no more than 0.5%, and wherein the range of operating wavelengths is 800 nm $\leq \lambda \leq$ 1600 nm, and wherein the axial length L is in the range 0.5 mm $\leq$ L $\leq$ 5 mm; and
transmitting the light between the input fiber and the field fiber through the GRIN lens with a coupling loss CL<0.2 dB over the range of operating wavelengths.

16. The method according to claim 15, wherein the GRIN lens has a nominal radius of either 50 μm, 62.5 μm or 80 μm.

17. The method according to claim 15, wherein the GRIN lens comprises $SiO_2$ doped with $GeO_2$.

* * * * *